(12) United States Patent
Fargeas et al.

(10) Patent No.: US 7,644,951 B2
(45) Date of Patent: Jan. 12, 2010

(54) ENERGY ABSORPTION DEVICE FOR STEERING COLUMN

(75) Inventors: Denis Fargeas, Naveil (FR); Robin Thomas, Marcilly-en-Beauce (FR); Frederic Calsat, Oucques (FR)

(73) Assignee: Necam France SAS (FR)

( * ) Notice: Subject to any disclaimer, the term of this patent is extended or adjusted under 35 U.S.C. 154(b) by 9 days.

(21) Appl. No.: 11/004,173

(22) Filed: Dec. 3, 2004

(65) Prior Publication Data

US 2006/0001249 A1 Jan. 5, 2006

(30) Foreign Application Priority Data

Dec. 4, 2003 (FR) .................................. 03 14269

(51) Int. Cl.
*B62D 1/18* (2006.01)
*B62D 1/19* (2006.01)

(52) U.S. Cl. .................. 280/777; 280/775; 188/371; 188/374; 188/377; 74/492; 74/493

(58) Field of Classification Search ................ 280/777, 280/775; 74/492, 493; 188/371, 374, 377
See application file for complete search history.

(56) References Cited

U.S. PATENT DOCUMENTS

| | | | | |
|---|---|---|---|---|
| 3,461,740 | A | * | 8/1969 | Moriya et al. ............. 74/492 |
| 5,342,091 | A | * | 8/1994 | Hancock .................... 280/777 |
| 5,495,777 | A | * | 3/1996 | Schneider et al. .......... 74/492 |
| 5,590,565 | A | | 1/1997 | Palfenier et al. |
| 5,722,300 | A | * | 3/1998 | Burkhard et al. ........... 74/493 |
| 5,813,794 | A | * | 9/1998 | Castellon ................. 403/359.5 |
| 5,984,354 | A | | 11/1999 | Kim |
| 6,099,037 | A | * | 8/2000 | Korzan .................... 280/777 |
| 6,223,619 | B1 | | 5/2001 | Shibata et al. |
| 6,349,610 | B2 | * | 2/2002 | Glinowiecki et al. ........ 74/492 |
| 6,666,772 | B1 | * | 12/2003 | Cheney et al. ............. 464/183 |
| 6,729,648 | B2 | * | 5/2004 | Ulintz .................... 280/777 |
| 6,840,128 | B1 | * | 1/2005 | Shioya et al. ............. 74/492 |
| 6,848,334 | B2 | * | 2/2005 | Kluemper et al. .......... 74/492 |
| 6,942,250 | B2 | * | 9/2005 | Dubay et al. ............. 280/777 |
| 2001/0011486 | A1 | * | 8/2001 | Glinowiecki et al. ........ 74/492 |
| 2002/0017155 | A1 | * | 2/2002 | Aota ...................... 74/492 |
| 2002/0088296 | A1 | * | 7/2002 | Schroter et al. ........... 74/492 |
| 2002/0124676 | A1 | * | 9/2002 | Kluemper et al. .......... 74/492 |

(Continued)

FOREIGN PATENT DOCUMENTS

FR     2 161 449     7/1973

(Continued)

*Primary Examiner*—Paul N. Dickson
*Assistant Examiner*—Barry Gooden, Jr.
(74) *Attorney, Agent, or Firm*—DLA Piper LLP (US)

(57) ABSTRACT

This invention pertains to an energy absorption device for a motor vehicle steering column in which there is mounted an adjustment slide, the adjustment slide including a female part, provided with an entry orifice, connected respectively either to a steering wheel or to a rack system, and a male part connected respectively either to the rack system or to the steering wheel, the male part sliding in the female part upon adjustment of the depth of the steering column, wherein at least one sleeve is fixed on the male part in a manner to absorb the energy by coming into contact at least partially with the entry orifice of the female part in the case of violent impact.

10 Claims, 3 Drawing Sheets

U.S. PATENT DOCUMENTS

| | | | |
|---|---|---|---|
| 2004/0104567 A1* | 6/2004 | Kinme et al. | 280/777 |
| 2004/0217581 A1* | 11/2004 | Dubay et al. | 280/777 |
| 2005/0156423 A1* | 7/2005 | Appleyard | 280/777 |
| 2005/0167963 A1* | 8/2005 | Jurik et al. | 280/777 |
| 2006/0001249 A1* | 1/2006 | Fargeas et al. | 280/777 |
| 2006/0125224 A1* | 6/2006 | Higashino et al. | 280/777 |
| 2006/0290129 A1* | 12/2006 | Inayoshi et al. | 280/777 |

FOREIGN PATENT DOCUMENTS

FR        2 708 689        2/1995

* cited by examiner

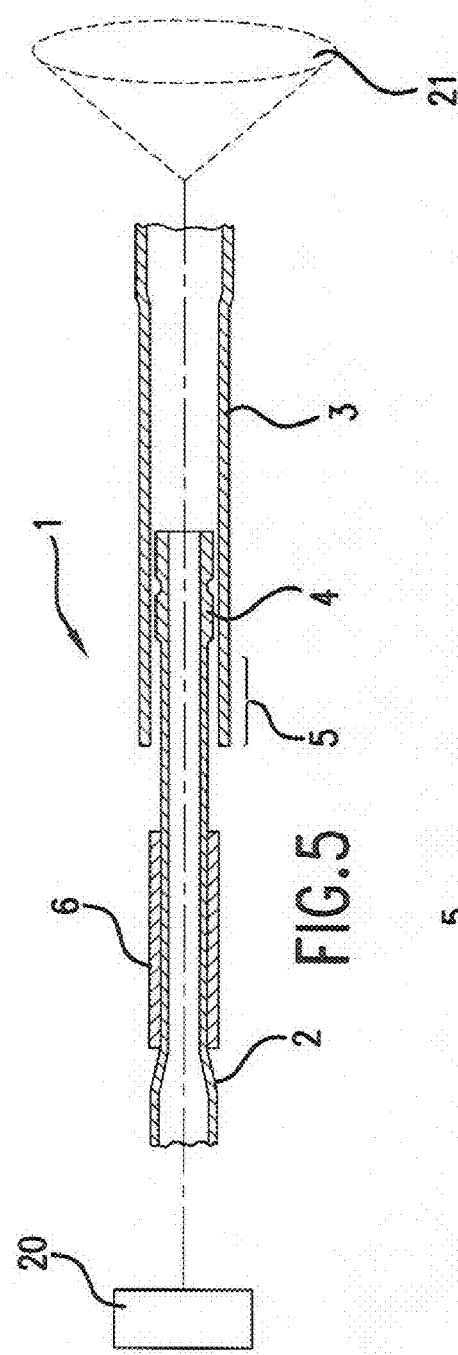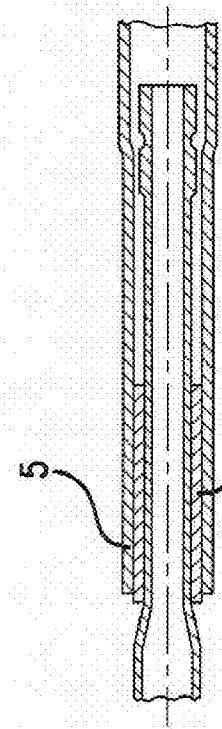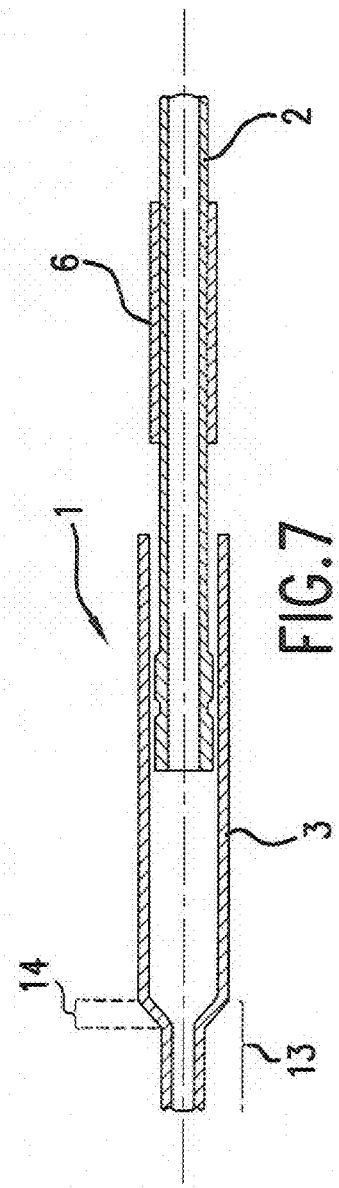

ENERGY ABSORPTION DEVICE FOR STEERING COLUMN

RELATED APPLICATION

This application claims priority of French Patent Application No. 03/14269, filed Dec. 4, 2003, herein incorporated by reference.

FIELD OF THE INVENTION

This invention pertains to the field of energy absorption systems for steering columns.

BACKGROUND

A motor vehicle steering column must conventionally provide three functions:

1. transmit a force between the steering wheel and the steering system to enable the rotation of the wheels when the steering wheel is turned,
2. adjust the height and depth of the position of the steering wheel in the vehicle,
3. retract while absorbing the energy of the driver in the case of an accident.

There are presently known on the market steering columns in which are present three independent complex devices to provide each of the three above-mentioned functions. Since these three devices require a set of complex, bulky components, the manufacturing costs of such a steering column are relatively high. Moreover, the present bulk-reduction requirements mean that it is necessary to provide systems performing these three functions and presenting the smallest dimensions possible.

Known already is U.S. Pat. No. 6,234,528, which describes an adjustable energy absorption device for a motor vehicle steering column. This type of energy absorption system functions well but requires the creation of supplementary parts including a multiplicity of deformable parts absorbing the energy upon their deformations which must be attached by the intermediary of other elements to the steering column. This energy absorption system is therefore expensive. Moreover, this system requires the installation of a multiplicity of parts at the level of or close to the steering column. This has a negative impact to the extent that gaining space is essential not only to facilitate their installation, but also to allow the placement of other materials.

FR 2714649 describes an energy absorption component interposed between two elements capable of moving away from each other under the action of an external forces. The component comprises a first part extending around a support shaft mounted on a first element and a second rectilinear part extending the first part having a free end fixed on the second element and extending between the two elements while being oriented essentially in the direction of the force. The component also includes a wire coiled into joined spires constituting a coil positioned around the support shaft of the first element such that the traction exerted on the wire by the moving apart of the two elements causes the unwinding of the coil around the support shaft and thus the required absorption of energy.

Also known is JP 2001 334944 which endeavors to reduce the number of parts required for the implementation of an energy absorption device for a steering column in a manner that is both effective and inexpensive. In that system, the impact absorption part comprises a rotary device mounted on one of the elements of the steering column, a component capable of rotating around the horizontal axis between the steering column element and the body of the motor vehicle, a linear component linked to the rotary device and having its two ends fixed to the rotary device, and a fixed engagement hook of the other side of the steering column element and engaged with the central part of the linear component.

When an impact occurs, the engagement hook pulls the part linked to the rotary device of the linear component to plastically deform this part of the linear component and then drive in rotation the rotary device so as to absorb the energy of the impact. It can be understood that despite the desire to create an energy absorption device comprising a small number of elements, that device remains very complex and thus costly.

It is in fact very difficult to envision the creation of a simple, inexpensive energy absorption device that can satisfy all of the requirements imposed by the automobile manufacturers and dealers.

JP 3279085 discloses an energy absorption device for steering columns comprising an additional element as well as sliding guides fixed on the steering column. That device is complex both because of its creation and its attachment to the steering column. It is also bulky because it occupies a considerable amount of space.

SUMMARY OF THE INVENTION

This invention relates to an energy absorption device for a motor vehicle steering column including a steering column in which is mounted an adjustment slide, the adjustment slide including a female part provided with an entry orifice, connected respectively either to a steering wheel or to a rack system, and a male part connected respectively either to the rack system or the steering wheel, wherein one part slides in the other part upon adjustment of the depth of the steering column, and wherein at least one sleeve is fixed on the male part to absorb energy by coming at least partially into contact with the entry orifice of the female part in the case of violent impact.

BRIEF DESCRIPTION OF THE DRAWINGS

Better comprehension of the invention will be obtained from the description provided below for purely explanatory purposes of one mode of implementation of the invention with reference to the attached figures:

FIG. 5 illustrates a sectional view of the female part and the male part of the adjustment slide as well as the sleeve according to the invention prior to an impact;

FIG. 6 illustrates a sectional view of the elements shown in FIG. 5 after impact; and FIG. 7 illustrates a sectional view of a variant of implementation of the female part of the adjustment slide also capable of absorbing the energy of an impact.

DETAILED DESCRIPTION

Figure 1:
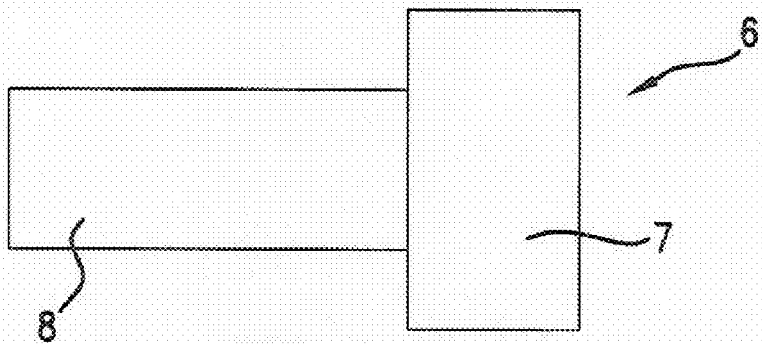
FIG. 1 illustrates a sectional view of the sleeve according to the invention in the case in which a constant absorption of energy is desired.

It will be appreciated that the following description is intended to refer to specific embodiments of the invention selected for illustration in the drawings and is not intended to define or limit the invention, other than in the appended claims.

This invention provides an energy absorption device using the adjustment slide of the steering column, i.e., the adjustment slide provides not only for the adjustment in depth of the steering column, but also the function of energy absorption in the case of an accident. Thus, upon compression of the steering column under the effect of an impact, the female steering shaft interferes with the male steering shaft by the intermediary of a plastic sleeve.

This invention pertains to an energy absorption device for a motor vehicle steering column, for example, of an automobile, comprising a steering column in which is mounted an adjustment slide, the adjustment slide comprising a female part, provided with an entry orifice, connected respectively either to the steering wheel or to the rack system, and a male part connected respectively either to a rack system or to the steering wheel, the one sliding in the other notably upon adjustment of the depth of the steering column, wherein at least one sleeve is fixed on the male part in a manner to absorb energy by coming into contact at least partially with the entry orifice of the female part in the case of violent impact, in particular in the case of an accident.

The term "violent impact" is understood to mean any force forcing the steering column, and thus the male and female parts of the adjustment slide, to become compressed beyond the possibilities offered by the depth adjustment function of the steering column. It should be noted that adjustment of the steering column enables a sliding of the parts of the steering column, notably the two parts (male and female) of the adjustment slide. In the case of an accident, this sliding of the parts of the steering column is of an amplitude approximately two times greater than an adjustment phase slide.

It should also be noted that although the energy absorption device is employed at the level of the male and female parts of the adjustment slide, it could also be installed in the same manner respectively on the male and female parts of the steering column. In fact, one makes a distinction here between the male and female parts of the adjustment slide, which are part of the steering column, as opposed to the steering column itself which is also composed of a male and a female part also connected to the chassis of the vehicle and to the steering wheel.

The end of the male part advantageously comprises an at least partially ribbed part overmolded by a plastic material. The female part advantageously comprises at its end an interior circumferential ribbing; the section of the profile of this ribbing is inscribed between two circles of diameters c and d, with c<d. The diameter of the sleeve is preferably larger than c.

The sleeve advantageously comprises a cylindrical part or ring of uniform diameter. The cylindrical part of the sleeve preferably has a diameter essentially equal to or larger than c. The cylindrical part advantageously is extended by a second cylindrical section of diameter larger than the diameter of the preceding cylindrical part. The second section advantageously has a diameter greater than c.

According to one aspect, the succession of the cylindrical part followed by the second cylindrical part is repeated a multiplicity of times along the length of the sleeve. The sleeve is preferably made of plastic such as, e.g., a polyamide (PA) 4 or 6 or a polyamide 11 or a polyoxymethylene.

According to one mode of implementation, the sleeve and the plastic overmolding are made of the same material. According to one mode of implementation, the female part comprises a constricted part the diameter of which is smaller than the average diameter of said female part. The diameter of the constricted part advantageously decreases essentially linearly.

By means of the device according to the invention, an energy absorption function is provided for an axially adjustable steering column without addition of supplementary components and at low cost (modification of or addition to the existing components). This device is moreover responsive to restrictions on bulk because it does not use any additional space other than the space used by the steering column itself. Lastly, according to the diverse variants of implementation of the device according to the invention, it is possible to produce in an extremely simple manner multiple forms or possibilities of energy absorption.

Turning now to the drawings in general, a steering column (not shown), comprises an adjustment slide 1 comprising a male part 2 linked to the rack system 20 actuating a steering rod for the two front wheels of the vehicle, and a female part 3 linked to the steering wheel 21. These two parts, male 2 and female 3, slide in each other and have the first function of enabling the depth adjustment of the steering column. In effect, the driver has available close to the steering wheel a control that allows adjustment of the steering wheel in a suitable manner, essentially in relation to the driver's size, to provide the best steering wheel position during driving.

Figure 8:
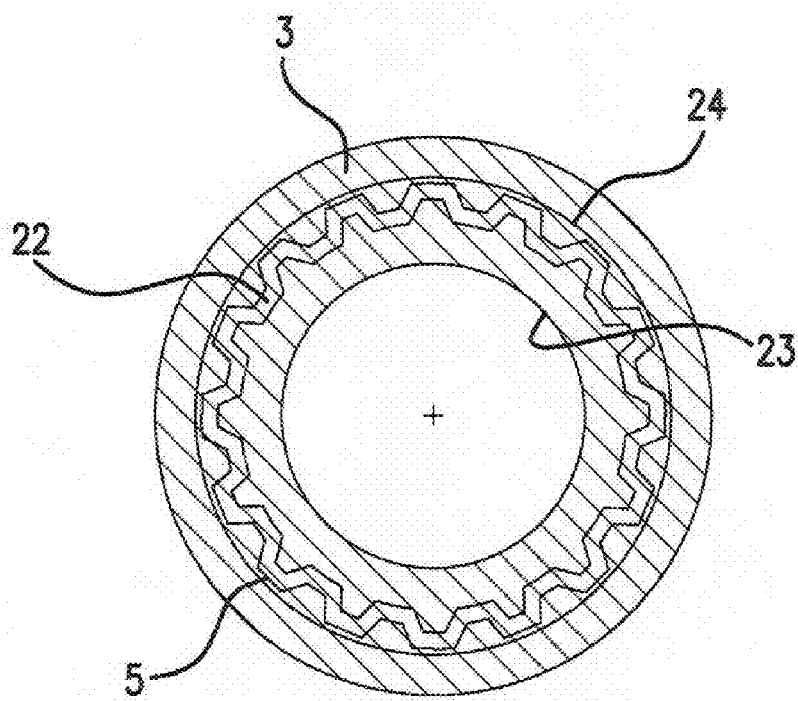

The male part 2 of the adjustment slide 1 is thus capable of sliding in the female part 3 on the order of approximately 40 millimeters for the adjustment of the steering column by the driver. The male 2 and female 3 parts each have a cylindrical end, the diameter of the female part 3 being larger than the diameter of the male part 2. The male part 2 comprises at its end close to the female part 3 a ribbed part 4 which is overmolded by a plastic overmolding 22 in a manner such that it is well integrated, i.e., without play or with a minimum of play, in the female part 3. The plastic overmolding 22 of the ribbed part is shown in FIG. 8. The female part comprises at an end an interior circumferential ribbing, wherein a section of a profile of the ribbing is inscribed between two circles 23, 24 of diameters c and d, respectively, with c<d.

The female part 3 comprises at its end a ribbing consisting of a multiplicity of teeth. The tops of the teeth can of course be inscribed in a circle of a diameter slightly smaller than the diameter of this end of the female part 3. These teeth form protuberances extending towards the center of the cylinder. These teeth are arranged in a uniform manner distributed along the circumference of the cylinder.

The present invention endeavors to use the adjustment slide 1 to also confer on it the energy absorption function in the case of violent impact, i.e., in the case of an accident. This is made possible by the addition of an extremely small part, i.e., a sleeve 6, on the male part 2 of the adjustment slide 1, the sleeve 6 interfering with the female part 3 of the adjustment slide 1.

The plastic sleeve 6 is fixed onto the cylindrical end of the male part 2 such that when the male part 2 slides in the female part 3, the cylindrical walls of the female part 3 come into contact with the sleeve 6 and the sleeve consequently absorbs the energy of the impact of an accident transmitted to the steering column. The dimensions of the sleeve 6 are therefore selected in a manner to allow the female part 3, or at least a section of this female part 3, to come into contact with the sleeve 6 upon its displacement beyond the limits set by the adjustment slide 1 and intended to enable the sliding of the male 2 and female 3 parts to select the personalized position of the steering wheel selected by the driver.

Lastly, to illustrate the invention if the cylindrical ribbed end of the female part 3 has a diameter smaller than 20 millimeters maximum, then the sleeve 6 will have a diameter greater than or equal to 20 millimeters. The length of the sleeve 6 is comprised between 3 and 10 millimeters. Under these conditions, the sleeve 6 will come into contact with the protuberant teeth forming the end of the female part 3 in a manner to brake the course of the male part 2 in the female part 3. It can be envisioned that the ribbing 5 of the female part has protuberances of a form especially designed to brake in a particular manner the course of the male part 2. The ribbing 5 has, e.g., teeth the height of which increases when the male part 2 penetrates into the female part 3 such that the resistance to the sleeve 6 increases as the male part 2 penetrates into the female part 3.

The sleeve 6 is made principally in two ways. It is possible to make the sleeve 6 in a manner totally independent from the male part 2, i.e., in preparing, e.g., by molding the sleeve 6 and then attaching it, e.g., by gluing, or clipping onto the male part 2. According to a preferred mode of implementation, it is also possible to overmold the sleeve 6 on the male part 2 just like the overmolded part is attached at the end 4 of the male part 2. Thus, advantageously, the material used for the overmolding of the end 4 of the male part 2 would be identical to the material used for the sleeve 6.

The shape of the sleeve 6 is essential in the invention, i.e., the absorption of energy and the manner in which it is desired to absorb this energy. Thus, this shape will vary depending on whether it is desired to absorb the energy in a constant, increasing, stepwise or increasing/decreasing manner.

As an example, in the case of a female part 3 with ribbing of constant profile, FIG. 1 shows the sleeve 6 when it is desired to implement a constant absorption of energy. In this case, the sleeve 6 has a T shape with a first section 7 of diameter larger than a second section 8, the length of the first section 7 being in contrast smaller than the length of the second section 8. The first section 7 enables absorption of noteworthy energy while the second part 8 enables absorption of energy essentially uniform in relation to the displacement over the course determined by its length.

Figure 2:
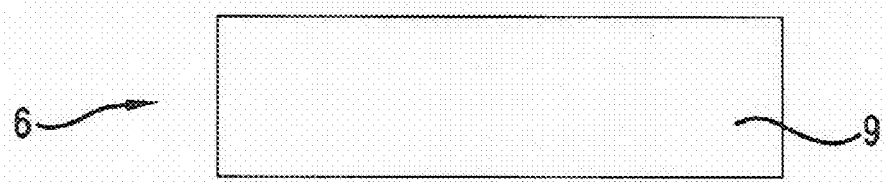
FIG. 2 illustrates a sectional view of the sleeve according to the invention in the case in which an increasing absorption of energy is desired.

FIG. 2 shows the sleeve 6 when it is desired to have an increasing absorption of energy over the course of the displacement. In this case, the sleeve 6 is in the form of a cylinder of constant diameter 9 over its entire length, the length being a function of the desired absorption of energy because the absorption of energy follows a straight line as a function of the displacement over the course determined by the length of the sleeve 6.

Figure 3:
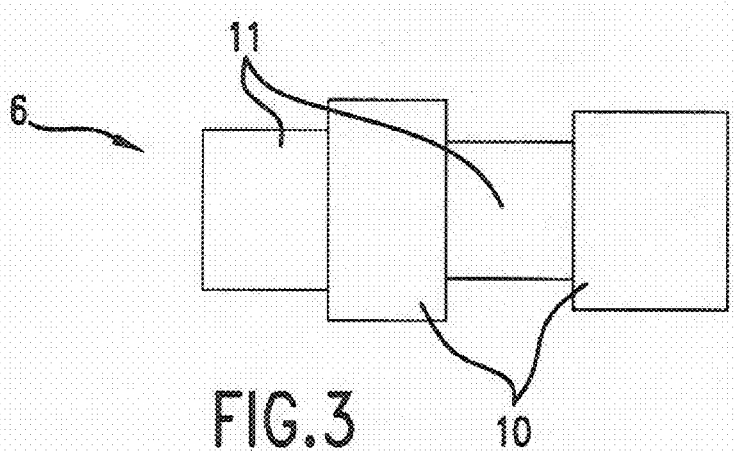
FIG. 3 illustrates a sectional view of the sleeve according to the invention in the case in which an absorption of energy by stages or levels is desired.

FIG. 3 shows the sleeve 6 when it is desired to have a stepwise absorption of energy. In this case, therefore, the sleeve 6 is in the form of a succession of two sections, the first 10 (i.e., the section that first comes into contact with the female part 3) having a diameter larger than that of the second section 11, the lengths of each section 10, 11 being dependent on the absorption desired for each step as well as the climb in energy (absorbed) from one step to the next. The energy absorption curve with such a sleeve 6 therefore is in the form of a succession of steps linked by a stepped climb, the stepped climb being a function of the diameter and length of the first section 10 while the step itself is a function of the length of the second section 11 (of diameter smaller than the first section 10). It is obviously possible to multiply the number of pairs of sections 10, 11 as much as desired for the energy absorption to be performed.

Figure 4:
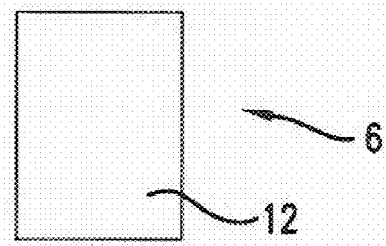
FIG. 4 illustrates a sectional view of the sleeve according to the invention in the case in which an increasing then decreasing absorption of energy is desired.

Lastly, FIG. 4 shows a sleeve 6 when it is desired to have an increasing and then a decreasing absorption of energy. In this case, the sleeve 6 is of uniform diameter and relatively short length. The increasing phase is a function of the length of the sleeve 6 and its intensity is a function of the diameter of the sleeve.

FIG. 7 shows a possibility of implementation of the female part 3 of the adjustment slide 1. In this mode of implementation, the female part 3 has at least one section 13 of smaller diameter consisting of e.g., a constant constriction 14 of the diameter. Thus, not only does the sleeve 6 absorb the energy, but also the female part 3 itself, the diameter of this section 13, 14 being smaller than that of the male part 2.

It should be noted that the section 13, 14 of diameter smaller than that of the male part 2 is used here in combination with the sleeve 6, but it is also possible to provide that this section 13, 14 alone provides the energy absorption function. Moreover, the female part 3 can provide a multiplicity of sections 13, 14 of diameter smaller than the diameter of the male part 2 consisting, e.g., of V-shaped protuberances extending towards the center of the cylinder formed by the female part 3. It should be noted that this or these section(s) can be obtained by various technologies such as hot or cold drawing or forming of the female part 2.

The invention was described above as an example. It is understood that one of ordinary skill in the art can implement different aspects of the invention without thereby departing from the spirit of the invention as defined in the appended claims.

The invention claimed is:

1. An energy absorption device for a motor vehicle steering column comprising a steering column in which there is mounted an adjustment slide, the adjustment slide comprising a female steering shaft part provided with an entry orifice, connected respectively either to a steering wheel or to a rack system, and a male steering shaft part connected respectively either to the rack system or the steering wheel, wherein the male steering shaft part slides in the female steering shaft part upon adjustment of the depth of the steering column within limits for selecting a desired position of the steering wheel selected by a driver, and wherein at least one sleeve is fixed to and overmolded on the male steering shaft part to absorb energy by at least partially contacting the entry orifice of the female steering shaft part upon displacement of the male steering shaft part beyond the limits in the case of violent impact, wherein the sleeve is located outside of the female steering shaft part when the male steering shaft part slides within the female steering shaft part within said limits, wherein an end of the male part comprises a ribbed part at least partially overmolded by a plastic material, wherein the sleeve is made of plastic, and wherein the sleeve and the plastic overmolding are made of the same material.

2. The energy absorption device according to claim 1, wherein the female part comprises at an end an interior circumferential fibbing, wherein a section of a profile of the ribbing is inscribed between two circles of diameters c and d, with c<d.

3. The energy absorption device according to claim 1, wherein the sleeve comprises a cylindrical part of uniform diameter.

4. The energy absorption device according to claim 3, wherein the cylindrical part has a diameter greater than the outer diameter of the male steering shaft.

5. The energy absorption device according to claim 3, wherein the cylindrical part is extended by a second cylindrical part of diameter greater than the diameter of the cylindrical part.

6. The energy absorption device according to claim 5, wherein the second cylindrical part has a diameter greater than the outer diameter of the male steering shaft.

7. The energy absorption device according to claim 1, wherein the plastic is a polyamide (PA)4,6 or a polyamide 11 or a polyoxymethylene.

8. An energy absorption device for a motor vehicle steering column comprising a steering column in which there is mounted an adjustment slide, the adjustment slide comprising a female steering shaft part provided with an entry orifice, connected respectively either to a steering wheel or to a rack system, and a male steering shaft part connected respectively either to the rack system or the steering wheel, wherein the male steering shaft part slides in the female steering shaft part upon adjustment of the depth of the steering column within limits for selecting a desired position of the steering wheel selected by a driver, and wherein at least one sleeve is fixed on the male steering shaft part to absorb energy by at least partially contacting the entry orifice of the female steering shaft part upon displacement of the male steering shaft part beyond the limits in the case of violent impact, wherein the sleeve is located outside of the female steering shaft part when the male steering shaft part slides within the female steering shaft part within said limits, wherein the sleeve comprises a cylindrical part of uniform diameter and wherein the cylindrical part is extended by a second cylindrical part of a diameter greater than the diameter of the cylindrical part, wherein succession of the cylindrical part and the second cylindrical part is repeated a multiplicity of times along the length of the sleeve.

9. An energy absorption device for a motor vehicle steering column comprising a steering column in which there is mounted an adjustment slide, the adjustment slide comprising a female steering shaft part provided with an entry orifice, connected respectively either to a steering wheel or to a rack system, and a male steering shaft part connected respectively either to the rack system or the steering wheel, wherein the male steering shaft part slides in the female steering shaft part upon adjustment of the depth of the steering column within limits for selecting a desired position of the steering wheel selected by a driver, and wherein at least one sleeve is fixed to and overmolded on the male steering shaft part to absorb energy by at least partially contacting the entry orifice of the female steering shaft part upon displacement of the male steering shaft part beyond the limits in the case of violent impact, wherein the sleeve is located outside of the female steering shaft part when the male steering shaft part slides within the female steering shaft part within said limits, wherein the female part comprises a constricted part, the diameter of which is smaller than the average diameter of the female part.

10. The energy absorption device according to claim 9, wherein the diameter of the constricted part decreases essentially linearly.

\* \* \* \* \*

UNITED STATES PATENT AND TRADEMARK OFFICE
CERTIFICATE OF CORRECTION

| | |
|---|---|
| PATENT NO. | : 7,644,951 B2 |
| APPLICATION NO. | : 11/004173 |
| DATED | : January 12, 2010 |
| INVENTOR(S) | : Fargeas et al. |

It is certified that error appears in the above-identified patent and that said Letters Patent is hereby corrected as shown below:

On the Title Page
Item (73) please change "Necam" to --Nacam--.

Signed and Sealed this

Ninth Day of March, 2010

David J. Kappos
*Director of the United States Patent and Trademark Office*